March 16, 1943.  H. SCOTT-PAINE ET AL  2,314,165
STEERING GEAR FOR VEHICLES
Filed Feb. 7, 1941   3 Sheets-Sheet 3
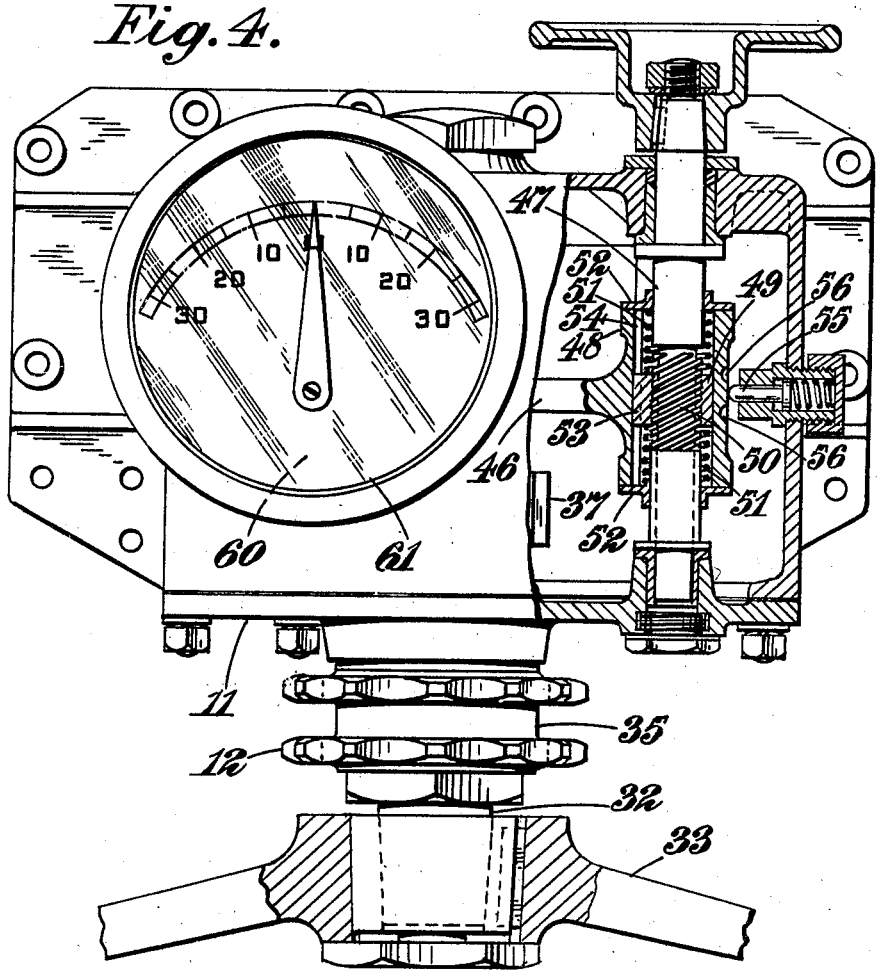

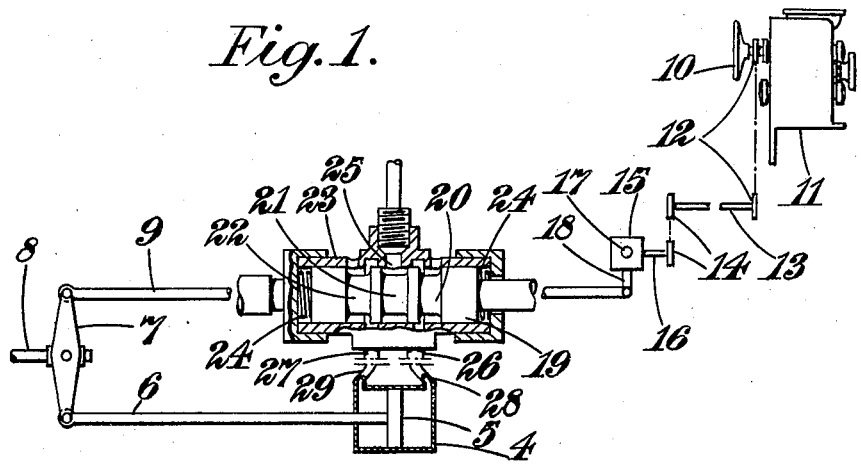
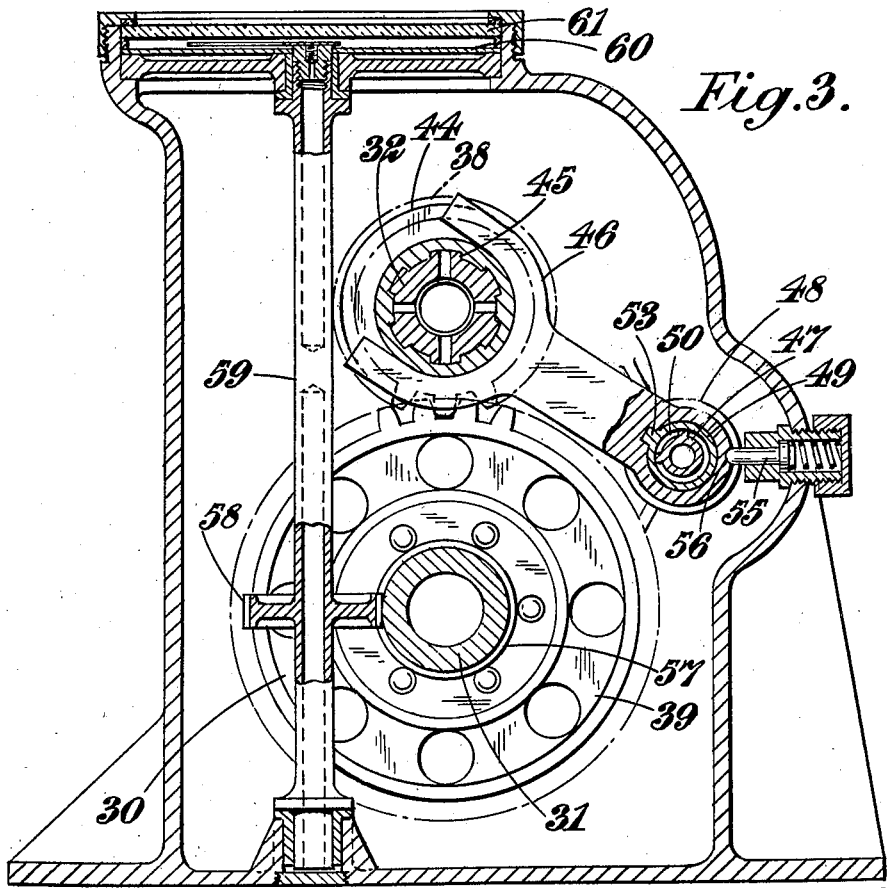

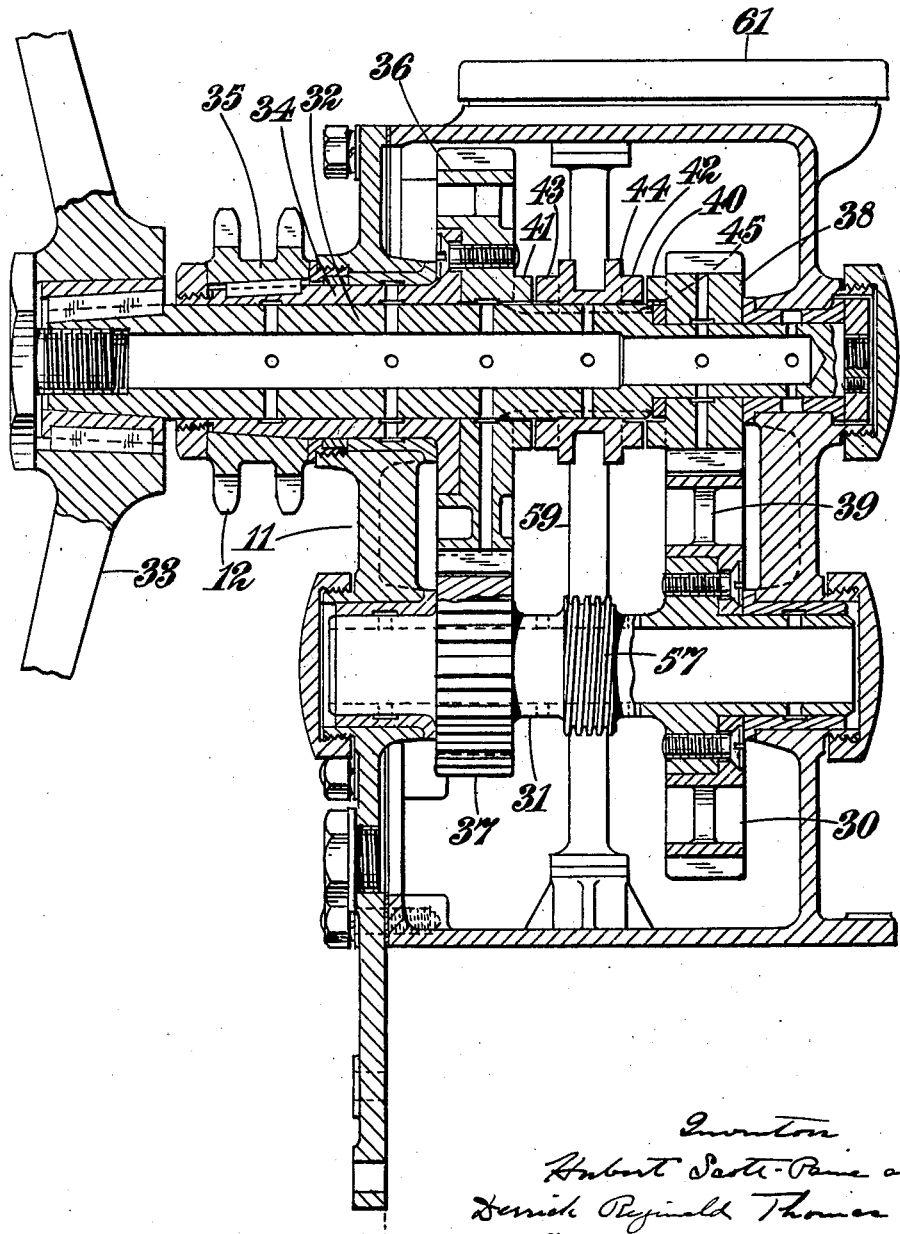

Patented Mar. 16, 1943

2,314,165

UNITED STATES PATENT OFFICE 2,314,165

STEERING GEAR FOR VEHICLES

Hubert Scott - Paine and Derrick Reginald Thomas, Hythe, England; said Thomas assignor to said Scott-Paine Application February 7, 1941, Serial No. 377,822
In Great Britain December 14, 1939

2 Claims. (Cl. 74—100)

This invention is for improvements in or relating to steering gear for vehicles, which latter term is intended to include watercraft and aircraft as well as road vehicles. It is found, under certain conditions, that it is advantageous to be able to adjust the speed at which the steering element (for example, the rudder or road wheels) may be moved for a given rate of movement of the control mechanisms.

According to this invention, a steering gear for a vehicle comprises a change-speed-gear box having driving and driven shafts, a handwheel or its equivalent mounted on the driving shaft adjacent the gear box, an executive member such as a rudder or steering road wheels, and a transmission from the driven shaft to the said executive member or to the control device of a steering motor connected to the latter.

In such arrangements the change-speed-gear box is provided with at least two gear ratios, one of which is intended to be employed under conditions which are most often encountered, while the other is adapted for use under special conditions which may arise from time to time. These conditions will depend upon the kind of vehicle in question and the service for which it is designed. In the case of a steering gear for a motor torpedo boat, for example, which is capable of turning with extreme rapidity, one ratio may be adapted for cruising conditions, for which purpose a fairly low ratio is most suitable, so that movements of the steering wheel of an ordinary comfortable extent produce the slow turning movements most suitable for maintaining a steady course, while another, substantially higher, ratio may be provided for use under conditions calling for maximum speed of manoeuvre. Under these conditions the "cruising" ratio would be unsuitable owing to the inconvenience of continuously turning the wheel, perhaps through several revolutions in either direction and the delay and quick fatigue caused thereby. On the other hand, the higher ratio would be equally unsuitable for general navigation on account of the too ready response, causing "oversteering" and consequently bad course keeping, unless a high degree of concentration is maintained, which again is unnecessarily fatiguing. Similar conditions apply in other types of high speed navigable craft, that is to say, water craft and aircraft, and corresponding advantages may be secured by the use of the steering gear according to the invention.

In the case of power-operated and power-assisted steering gears it is usual to provide an arrangement enabling steering to be carried on by hand power alone in the event of failure of the steering motor, and where in such steering gears a change-speed-gear is provided according to the invention, a special low speed ratio may be provided for use when power is not available. This ratio may be additional to the "cruising" and "manoeuvring" ratios referred to above.

It will be appreciated that it is desirable that a change of gear ratios should not result in the steering element becoming disconnected from the operating mechanism for any appreciable length of time. This could be avoided by employing an infinitely variable gear or a change-speed gear having a number of epicyclic gear trains which are selectively brought into operation. However, such gears, owing to their bulk, are not always suitable.

According to the present invention the change speed device comprises a clutch mechanism in which a movable clutch member is arranged at one limit of its movement to render one gear train operative and at the other limit to render operative either a direct drive or another gear train, which clutch member is operated through a spring-controlled snap-over action device which prevents it from assuming a neutral position. For example, the change speed device may comprise a gear box having driving and driven shafts each with a gear wheel mounted thereon, a layshaft on which is mounted two gear wheels in mesh with the first two gear wheels respectively, one of the two gear wheels on the driving shaft being rotatably mounted on its shaft and the other being fixed and both of them being provided on those faces directed towards one another with one part of a dog clutch, the other parts of which dog clutches are formed on a member fixed against rotation but capable of axially sliding on that shaft on which one of said gear wheels is rotatably mounted, which movable dog clutch member is operated by the aforesaid spring controlled snap-over mechanism.

In one of the arrangements referred to above a helm indicator may be driven from the driven member of the change speed device or a part gear connected therewith.

The following is a description of a number of different methods of applying a change-speed-gear to the steering gear of the vessel and also of one particular form of gear box, reference being made to the accompanying drawings in which:

Figure 1 shows diagrammatically a power-operated or power-assisted steering gear arranged to permit steering to be carried out by hand alone.

Figure 2 is a vertical section through a gear box suitable for use in the above arrangement;

Figure 3 is a section on the line 3—3 of Figure 2, and

Figure 4 is a plan view of the gear-box.

Referring to the construction shown in Figure 1, the hand steering wheel 10 is secured to the driving shaft of a change-speed-gear box 11 the driven shaft of which is connected by a chain and sprocket gear 12 to a transmission shaft 13. The transmission shaft in its turn is connected by a chain and sprocket gear 14 to a mechanism 15 which converts the rotary motion of its input shaft 16 to a swing motion of its output shaft 17, to which is secured an arm 18. The arm 18 is connected to a valve-member 19 shown on an enlarged scale having three circumferential grooves 20, 21 and 22 formed thereon. The valve member is reciprocally mounted in a valve casing 23 and a compression spring 24 is disposed between each end of the valve member and the adjacent end wall of the casing. The width of the central groove 21 is such that it always remains in register with a port 25 in the casing, which port communicates with a source of suction or pressure. The other grooves 20 and 22 may be brought into register with ports 26 and 27 respectively in the casing, which ports communicate through conduits 28 and 29 to opposite ends of a servo-motor cylinder 4, the piston 5 in which is connected by a rod 6 with one end of a cross-bar 7 fixed to the rudder 8. The other end of the cross-bar is connected by a rod 9 to one end of the casing.

With this arrangement, according to which way the valve member is moved, one or other end of the cylinder will be placed in communication with the source of suction or pressure, and the appropriate movement will be transmitted to the rudder. The follow-up motion transmitted to the valve casing will cut off the supply of suction or pressure and the rudder will be maintained in the position to which it has been moved.

If the servo-motor fails, motion may be transmitted to the rudder direct from the hand wheel and change-speed-gear box through the mechanism, valve-member 19, valve casing 23, rod 9 and cross-bar 7, the first part of the motion serving to compress one of the springs 24. A force may be applied to the rudder both by the hand steering wheel and the servo-motor should the wheel be moved quick enough.

The change-speed-gear box is shown in detail in Figures 2, 3 and 4, and comprises a substantially oil-tight casing 30 in which are journalled a lay-shaft 31, a driving shaft 32 projecting through one wall of the casing and carrying a steering hand-wheel 33 on the projecting part and a driven shaft in the form of a sleeve 34 concentrically mounted on the driving shaft and projecting through the same wall of the casing as the latter. On the projecting part of the driven shaft is mounted a chain sprocket 35 whereby the steering forces may be transmitted to the executive mechanism of the steering gear.

The tubular driven shaft projects a short distance within the casing and is there rigidly connected to a gear-wheel 36 in constant mesh with a gear-wheel 37 rigidly mounted on the lay-shaft. Adjacent the further wall of the casing a gear-wheel 38 is rotatably mounted on the driving shaft and is in constant mesh with a further gear-wheel 39 rigidly mounted on the lay-shaft. The gear-wheels mounted on the driven and driving shafts are provided with dogs 40 and 41 respectively adapted to be engaged by dogs 42, 43 formed on the opposite ends of a dog-clutch member 44 slidably mounted on a splined portion 45 of the driving shaft between them. By moving the dog-clutch member into engagement with the dogs on the gear-wheel secured to the tubular driven shaft it will be understood that a direct drive is obtained, while by engaging the dog-clutch member with the dogs on the gear-wheel rotatably mounted on the driving shaft, the drive takes place through the lay-shaft and any desired reduction or increase of ratio may be obtained by selecting the appropriate relative sizes of the gear-wheels.

The sliding dog-clutch member 44 is operated by an actuator or selector fork 46 (see Figure 3 and Figure 4) slidably mounted on an operating shaft 47 by means of a hollow boss 48 of sufficient length to contain a nut 49 mounted on a screw-threaded portion 50 of the operating shaft and a spring 51 between each end of the nut and the closed ends 52 of the hollow boss, the said ends constituting the bearing surfaces by which the fork slides upon the operating shaft. The nut is prevented from turning within the hollow boss by a projection 53 engaging a longitudinal groove 54 in the wall of the latter, so that when the operating shaft is turned by a suitable handle secured to it outside the casing, the nut moves along the shaft in one direction or the other and compresses one or other of the two springs, thereby tending to move the fork in the same direction.

A spring-loaded detent 55 is mounted in the wall of the casing adjacent the boss of the fork and engages one of two recesses 56 in the latter in each of the two speed positions. By suitable proportioning of the fork and loading of the detent in relation to the springs contained within the boss of the fork the effect is obtained that the holding action of the detent is not overcome until the operating spring has been sufficiently compressed to ensure the rapid and complete movement of the sliding dog-clutch into the new speed position. Full engagement of the dog-clutch may take place at once if the dogs are in correct alignment, or will in any case take place as soon as a fresh steering movement is made, irrespective of whether such movement originates from the steering hand-wheel or from the reaction of the rudder or other direction-controlling member. In this connection it should be noted that a characteristic of steering gears is that oscillations take place about a mean position, so that the parts will be stationary, or substantially so, when changes of speed are made and synchronising devices will, therefore, not be required even though the changes of ratio may be as much as or even greater than four to one.

Between the two gear-wheels mounted on the lay-shaft is a worm 57 engaging a worm-wheel 58 mounted on the vertical shaft 59 (see Figure 3) of a helm indicator 60 constructed in unit with the gear-box. For this purpose, the casing is provided at its upper part with a window 61 of transparent material through which the index and graduated scale of the helm indicator may be seen. The transmission ratio of the worm and worm-wheel is, of course, appropriately chosen according to the transmission ratio of the remainder of the steering system.

We claim:

1. A snap-action device for producing rapid straight line shifting between two positions comprising an actuator, said actuator having a hollow boss provided with a shoulder at each end, a threaded nut non-rotatably mounted in said boss and axially slidable therein, compression springs within said boss and between each of its shoulders and said nut, a rotatable shaft extending through said boss and having a threaded portion engaging the threads of said nut, means for rotating said shaft, and a spring-loaded detent adapted to hold said boss in one or the other of its two positions until a predetermined load has been imposed on one or the other of said compression springs.

2. A snap-action device according to the preceding claim in which said boss is slidably and rotatably mounted on said rotatable shaft.

HUBERT SCOTT-PAINE.
DERRICK REGINALD THOMAS.